United States Patent
Takaki (10) Patent No.: US 11,713,039 B2
(45) Date of Patent: Aug. 1, 2023

(54) DRIVING SUPPORT SYSTEM AND METHOD

(71) Applicant: DENSO CORPORATION, Kariya (JP)

(72) Inventor: Ryo Takaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 131 days.

(21) Appl. No.: 17/072,387

(22) Filed: Oct. 16, 2020

(65) Prior Publication Data
US 2021/0031763 A1 Feb. 4, 2021

Related U.S. Application Data

(63) Continuation of application No. PCT/JP2019/016022, filed on Apr. 12, 2019.

(30) Foreign Application Priority Data

Apr. 17, 2018 (JP) .................................. 2018-078918

(51) Int. Cl.
*B60W 30/095* (2012.01)
*G06K 9/00* (2022.01)
(Continued)

(52) U.S. Cl.
CPC ......... *B60W 30/0956* (2013.01); *G06V 20/58* (2022.01); *H04W 4/44* (2018.02);
(Continued)

(58) Field of Classification Search
CPC ..... B60W 30/0956; B60W 2554/4041; B60W 2556/65; B60W 2420/42; B60W 2520/06; H04W 4/44; G06V 20/58
See application file for complete search history.

(56) References Cited

U.S. PATENT DOCUMENTS 8,504,233 B1 * 8/2013 Ferguson ............. G06V 20/588
340/463
11,130,523 B2 * 9/2021 Kataoka ................. B62D 1/286
(Continued)

FOREIGN PATENT DOCUMENTS

JP 4918807 B2 2/2012
JP 2013-168019 A 8/2013
(Continued)

*Primary Examiner* — Peter D Nolan
*Assistant Examiner* — Demetra R Smith-Stewart
(74) *Attorney, Agent, or Firm* — Maschoff Brennan (57) ABSTRACT

A driving support system mountable to an own vehicle includes an object detection sensor detecting a first object, a communication unit performing communication with a second object around the own vehicle, a direction determining unit determining whether a first direction from the own vehicle to the first object is the same as a second direction from the own vehicle to the second object with which the communication unit performs communication, an identity determining unit determining whether the first object is identical with the second object based on information acquired by the object detection sensor and the communication unit when the first direction is the same as the second direction, and a driving supporting unit performing driving support based on information acquired from an object determined in advance between the first object and the second object when it is determined that the first object is identical with the second object.

11 Claims, 7 Drawing Sheets

(51) Int. Cl.
*H04W 4/44* (2018.01)
*G06V 20/58* (2022.01)

(52) U.S. Cl.
CPC ..... *B60W 2420/42* (2013.01); *B60W 2520/06* (2013.01); *B60W 2554/4041* (2020.02); *B60W 2556/65* (2020.02)

(56) References Cited

U.S. PATENT DOCUMENTS

2013/0282236 A1    10/2013    Kato et al.
2018/0157272 A1    6/2018    Suzuki
2019/0061743 A1*    2/2019    Ozawa ................. B60W 20/15

FOREIGN PATENT DOCUMENTS

| | | | |
|---|---|---|---|
| JP | 2014-160419 A | | 9/2014 |
| JP | 2017123065 A | * | 7/2017 |
| KR | 20170124979 A | * | 11/2017 |

* cited by examiner

DRIVING SUPPORT SYSTEM AND METHOD

CROSS-REFERENCE TO RELATED APPLICATION

The present application claims the benefit of priority from earlier Japanese Patent Application No. 2018-78918 filed Apr. 17, 2018, the description of which is incorporated herein by reference.

BACKGROUND

Technical Field

The present disclosure relates to a driving support system.

Related Art

Concerning a driving support system, for example, a literature discloses a technique of judging a degree of match between a preceding vehicle detected by a periphery monitoring means and the other vehicle which performs inter-vehicle communication, on the basis of a degree of overlap between a first vector indicating a moving amount and a moving direction of the preceding vehicle detected by the periphery monitoring means including a camera, a radar, and the like, and a second vector indicating a moving amount and a moving direction of the other vehicle acquired through inter-vehicle communication, selecting the other vehicle for which the degree of match is high, and traveling while following the other vehicle using inter-vehicle communication.

SUMMARY

As an aspect of the present disclosure, a driving support system mountable to an own vehicle is provided. This driving support system includes an object detection sensor capable of detecting a first object which exists in front of the own vehicle, a communication unit capable of performing communication with a second object which exists around the own vehicle, a direction determining unit configured to determine whether a first direction from the own vehicle to the first object detected by the object detection sensor is the same as a second direction from the own vehicle to the second object with which the communication unit performs communication, an identity determining unit configured to determine whether the first object is identical with the second object on the basis of information acquired by the object detection sensor and the communication unit in a case where the first direction is the same as the second direction, and a driving support unit configured to perform driving support on the basis of information acquired from an object determined in advance between the first object and the second object in a case where it is determined that the first object is identical with the second object.

DETAILED DESCRIPTION OF THE PREFERRED EMBODIMENTS

Concerning a driving support system, for example, JP 4918807 B discloses a technique of judging a degree of match between a preceding vehicle detected by a periphery monitoring means and the other vehicle which performs inter-vehicle communication, on the basis of a degree of overlap between a first vector indicating a moving amount and a moving direction of the preceding vehicle detected by the periphery monitoring means including a camera, a radar, and the like, and a second vector indicating a moving amount and a moving direction of the other vehicle acquired through inter-vehicle communication, selecting the other vehicle for which the degree of match is high, and traveling while following the other vehicle using inter-vehicle communication.

The technique disclosed in JP 4918807 B, which judges the degree of match on the basis of the degree of overlap between the first vector and the second vector, may judge different vehicles as the same vehicle for which the degree of match is to be determined if the vectors overlap with each other. This may cause, for example, a probability that a vehicle may travel while following a vehicle farther than a nearby vehicle using inter-vehicle communication, which may cause a case where appropriate driving support is hindered. It is therefore desired to provide a technique of enabling more appropriate driving support.

A. First Embodiment

Figure 1:
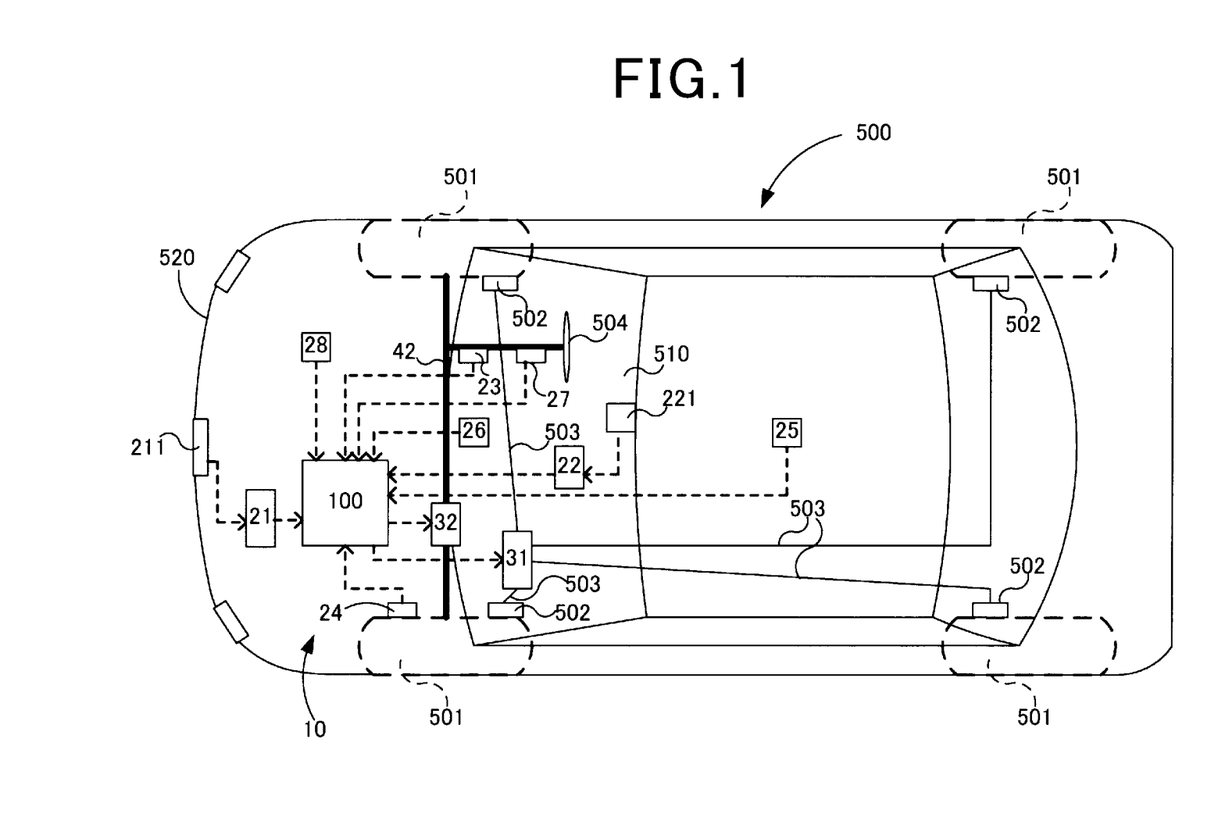
FIG. 1 is an explanatory diagram illustrating a configuration of a driving support system.

As illustrated in FIG. 1, a driving support system 10 according to an embodiment of the present disclosure is mounted to a vehicle 500. The driving support system 10 includes a driving support apparatus 100, a radar electronic control unit (ECU) 21, a camera ECU 22, a rotational angle sensor 23, a wheel speed sensor 24, a yaw rate sensor 25, a positioning sensor 26, a direction indicator sensor 27, a communication unit 28, a braking support apparatus 31, and a steering support apparatus 32. The driving support system 10 supports driving of a vehicle by a driver using these various kinds of apparatuses. Note that, hereinafter, the vehicle 500 will be referred to as an own vehicle 500, and vehicles other than the own vehicle 500 will be referred to as other vehicles.

Figure 2:
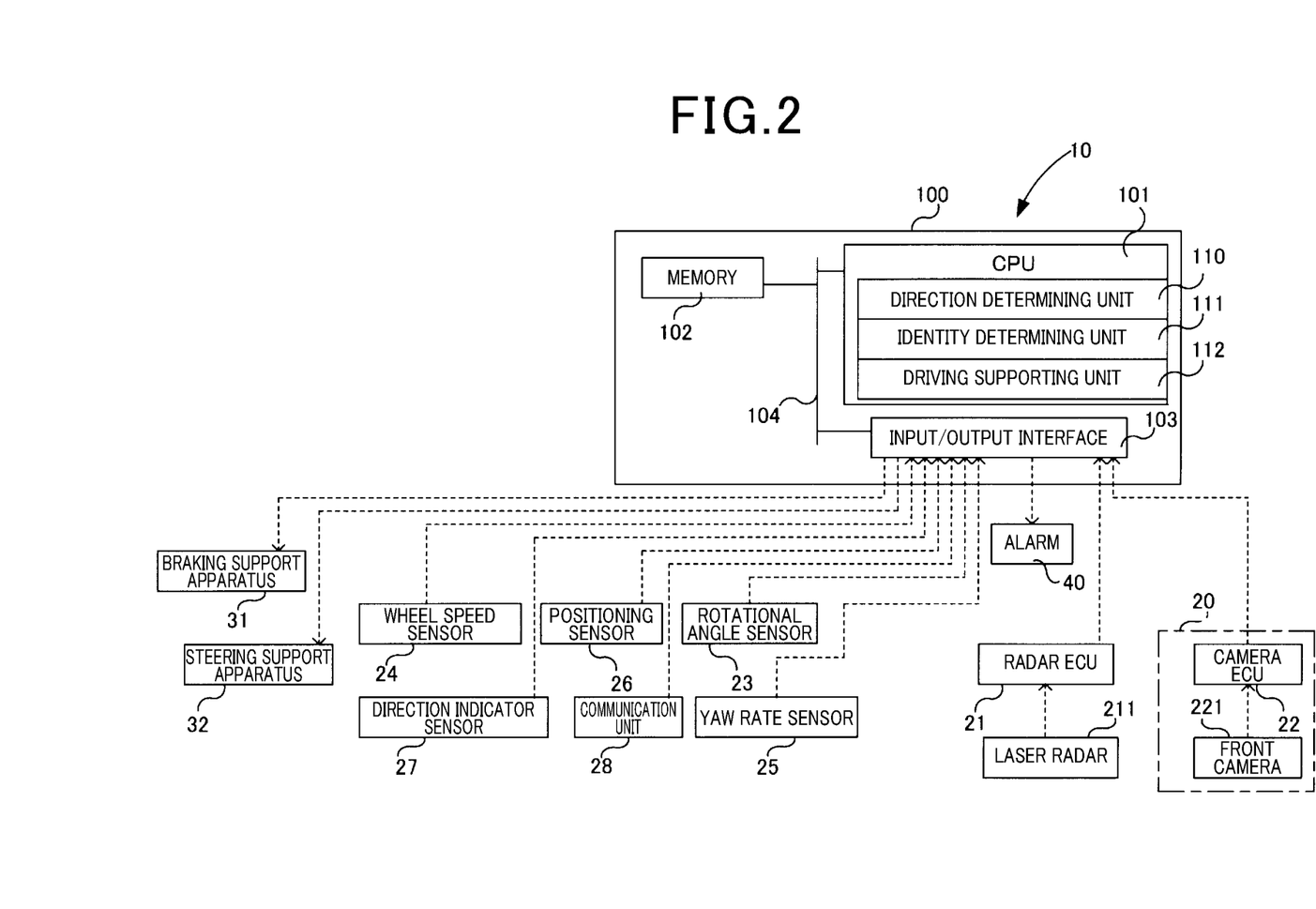
FIG. 2 is a block diagram of a driving support apparatus.

As illustrated in FIG. 2, the driving support apparatus 100 includes a CPU 101, a memory 102, an input/output interface 103, and a bus 104. The CPU 101, the memory 102 and the input/output interface 103 are connected to each other via the bus 104.

The radar ECU 21, the camera ECU 22, the rotational angle sensor 23, the wheel speed sensor 24, the yaw rate sensor 25, the positioning sensor 26, the direction indicator sensor 27, the communication unit 28, the braking support apparatus 31 and the steering support apparatus 32 are respectively connected to the input/output interface 103. These apparatuses can transmit and receive signals to and from the CPU 101 through the input/output interface 103 and the bus 104.

The radar ECU 21 is connected to a laser radar 211 which emits laser light and detects a distance to a target on the basis of time at which reflected light is received from the target. The laser radar 211 is disposed at the center of a front bumper 520. A signal output from the laser radar 211 is processed at the radar ECU 21 and input to the driving support apparatus 100 as a distance value. Note that the laser radar 211 may be provided at a ceiling portion of the vehicle 500.

The camera ECU 22, which is connected to a front camera 221, detects an object in a captured image from the image acquired with the front camera 221 using a well-known image recognition technique. In the present embodiment, the front camera 221 is a monocular camera. However, a stereo camera or a multiple camera including two or more cameras may be used as the front camera 221. In the present embodiment, the front camera 221 is disposed at the center of an upper portion of a windshield 510. In the present embodiment, the camera ECU 22 and the front camera 221 will be referred to as an "object detection sensor 20". The object detection sensor 20 can detect a first object which exists in front of the own vehicle 500 using the camera ECU 22 and the front camera 221.

A braking apparatus 502 is provided at each wheel 501. Each braking apparatus 502 is, for example, a disk brake or a drum brake, and applies a brake to each wheel 501 with braking force in accordance with a pressure of a brake fluid supplied via a braking line 503 in response to braking pedal operation by a driver, and implements braking of the vehicle 500. The braking line 503 includes a brake piston which generates pressure of a brake fluid in response to braking pedal operation, and a brake fluid line. Note that it is also possible to employ a configuration of the braking line 503 where a control signal line is provided in place of the brake fluid line, and an actuator provided at each braking apparatus 502 is actuated.

A steering wheel 504 is connected to a front wheel 501 via a steering apparatus 42 including a steering rod, a steering mechanism and a steering shaft.

The rotational angle sensor 23, which is a torque sensor detecting an amount of torsion, that is, steering torque occurring at the steering rod by steering of the steering wheel 504, detects a steering angle of the steering wheel 504. In the present embodiment, the rotational angle sensor 23 is provided at the steering rod which connects the steering wheel 504 and the steering mechanism. A detection signal output from the rotational angle sensor 23 is a voltage value proportional to an amount of twist.

The wheel speed sensor 24, which is a sensor detecting rotational speed of the wheel 501, is provided at each wheel 501. A detection signal output from the wheel speed sensor 24 is a voltage value proportional to wheel speed or a pulse wave indicating an interval in accordance with the wheel speed. The CPU 101 can obtain information such as vehicle speed and a travel distance of the vehicle using the detection signal from the wheel speed sensor 24.

The yaw rate sensor 25 is a sensor which detects rotational angular velocity of the vehicle 500. The yaw rate sensor 25 is, for example, disposed at a central portion of the vehicle. A detection signal output from the yaw rate sensor 25 is a voltage value proportional to a rotational direction and angular velocity, and a voltage value indicating changing lanes or turning left or right at the vehicle 500 can be detected.

The positioning sensor 26 is a sensor such as, for example, a global navigation satellite system (GNSS) receiver and a mobile communication transmitter/receiver for receiving a signal from a satellite or a base station and measuring a position of the own vehicle 500. The position of the own vehicle 500 is dealt with as current position information of the own vehicle.

The direction indicator sensor 27 detects operation of a direction indicator by a driver, that is, operation of turning right, turning left or changing lanes. The direction indicator sensor 27 may be provided at the direction indicator.

The communication unit 28 is an apparatus which receives or transmits information from or to the outside of the vehicle 500 in a wireless manner or with light. The communication unit 28 can perform communication with a second object which exists around the own vehicle 500. The communication unit 28 performs, for example, inter-vehicle communication with other vehicles and road-to-vehicle communication with traffic information service provider provided on a road. The communication unit 28 can acquire information representing a traveling state such as positions, speed and steering angles of other vehicles and vehicle information such as vehicle widths, total lengths, total heights and vehicle numbers of other vehicles through inter-vehicle communication. Additionally, the communication unit 28 can acquire various kinds of information regarding roads such as road regulation information, shapes of roads and information on intersections through road-to-vehicle communication.

The braking support apparatus 31 is an actuator for implementing braking by the braking apparatus 502 regardless of braking pedal operation by the driver. A driver for controlling operation of the actuator on the basis of a control signal from the CPU 101 is mounted to the braking support apparatus 31. In the present embodiment, the braking support apparatus 31 is provided at the braking line 503, and implements braking support and deceleration of vehicle speed in accordance with detection results of the front camera 221 and the laser radar 211 by increasing or decreasing a hydraulic pressure at the braking line 503 in accordance with a control signal from the driving support apparatus 100. The braking support apparatus 31 includes, for example, a module which includes an electric motor and a hydraulic piston driven by the electric motor. Alternatively, a braking control actuator which has already been introduced as an antiskid brake system and an antilock brake system may be used as the braking support apparatus 31.

The steering support apparatus 32 is an actuator for implementing steering by the steering apparatus 42 regardless of operation of the steering wheel 504 by the driver. A driver for controlling operation of the actuator on the basis of a control signal which gives an instruction of a steering angle from the CPU 101 is mounted to the steering support apparatus 32. In the present embodiment, the steering support apparatus 32 is provided at the steering shaft, and implements steering support in accordance with detection results of the front camera 221 and the laser radar 211 by driving the steering shaft in a horizontal direction in accordance with a control signal from the driving support apparatus 100 to change a steering angle of the front wheels 501. The steering support apparatus 32 includes, for example, a module which includes an electric motor and a pinion gear driven by the electric motor, and the steering shaft is actuated by the pinion gear driving a rack gear provided at the steering shaft. Note that the steering support apparatus 32 can be also used as a steering force assisting apparatus which assists steering force input from the steering wheel 504. Further, the steering support apparatus 32 may employ a configuration where a motor and the steering shaft are coaxially disposed, or may be integrally provided with the steering apparatus 42.

An alarm 40 is, for example, an apparatus which informs passengers of the own vehicle 500 of a probability of contact or collision between the other vehicle in front and the own vehicle. The alarm 40 includes, for example, a display screen for giving a warning and a speaker for giving a warning.

The CPU 101 functions as a direction determining unit 110, an identity determining unit 111 and a driving supporting unit 112 by executing control programs stored in the memory 102. The direction determining unit 110 determines whether a first direction from the own vehicle 500 to a first object detected by the object detection sensor 20 is the same as a second direction from the own vehicle 500 to a second object with which the communication unit 28 performs communication. The identity determining unit 111 determines whether the first object is identical with the second object on the basis of information acquired by the object detection sensor 20 and the communication unit 28 in a case where the first direction is the same as the second direction. The driving supporting unit 112 supports driving on the basis of information acquired from an object determined in advance between the first object and the second object in a case where it is determined that the first object is identical with the second object. Processing to be implemented by these functional units will be described in detail below.

Figure 3:
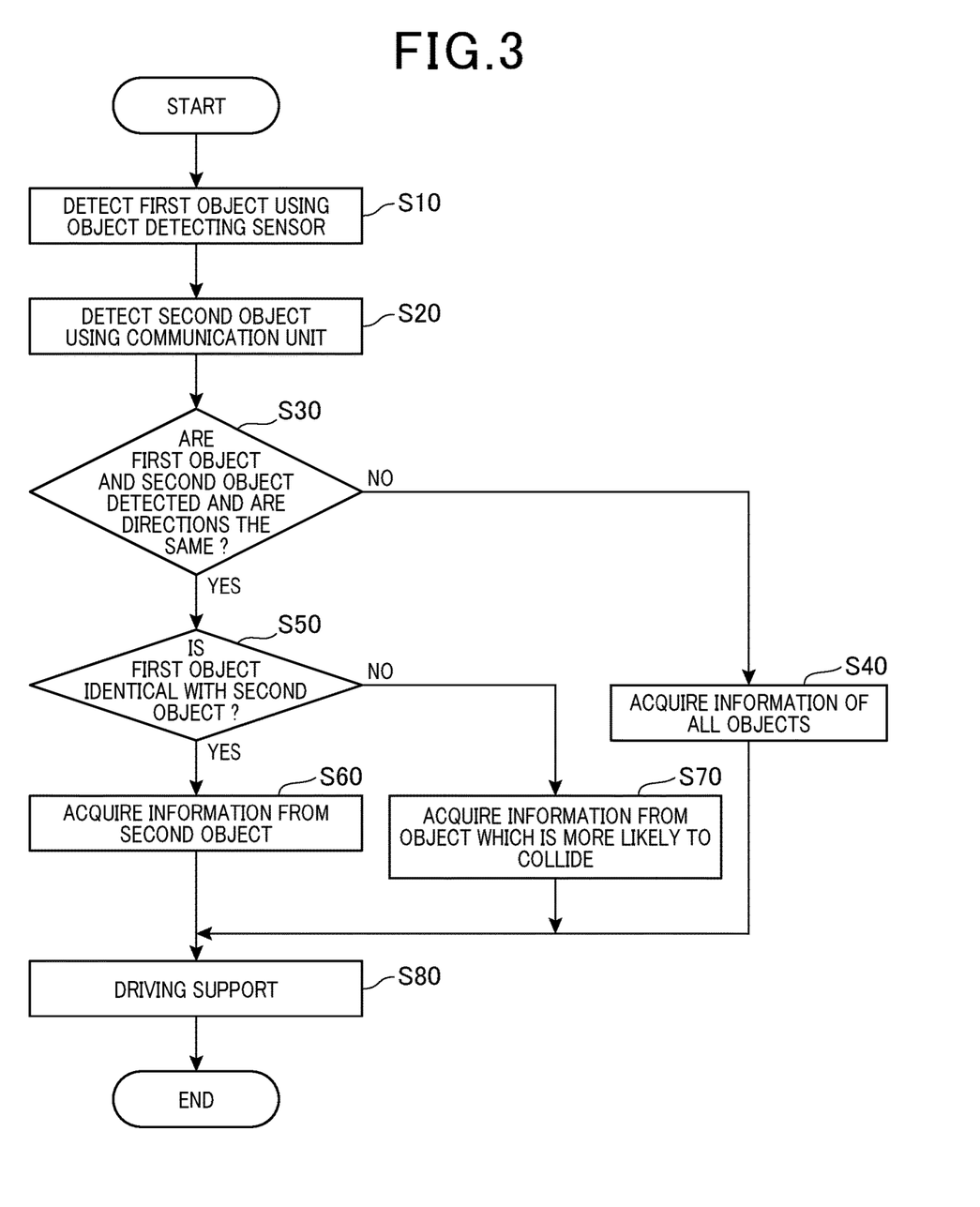
FIG. 3 is a flowchart of driving support processing.

Driving support processing to be executed by the driving support apparatus 100 will be described using FIG. 3. Processing routine illustrated in FIG. 3 is repeatedly executed at a control timing determined in advance from when a start switch of the own vehicle 500 is turned on until when the start switch is turned off.

First, the driving support apparatus 100 detects the first object using the object detection sensor 20 (step S10). Subsequently, the driving support apparatus 100 detects the second object by performing inter-vehicle communication with an object which exists around the own vehicle using the communication unit 28 (step S20). The communication unit 28 acquires information indicating a current position and a vehicle width of the second object from the second object through inter-vehicle communication. Acquisition of these kinds of information is regarded as detection of the second object by the communication unit 28. Processing in step S10 and step S20 may be performed in reverse order or may be performed at the same time. In step S10 and step S20, there can be a case where the first object and the second object are not detected.

The direction determining unit 110 of the driving support apparatus 100 judges whether objects (the first object and the second object) are detected by both the object detection sensor 20 and the communication unit 28 and whether directions from the own vehicle 500 to these objects are the same (step S30).

Figure 4:
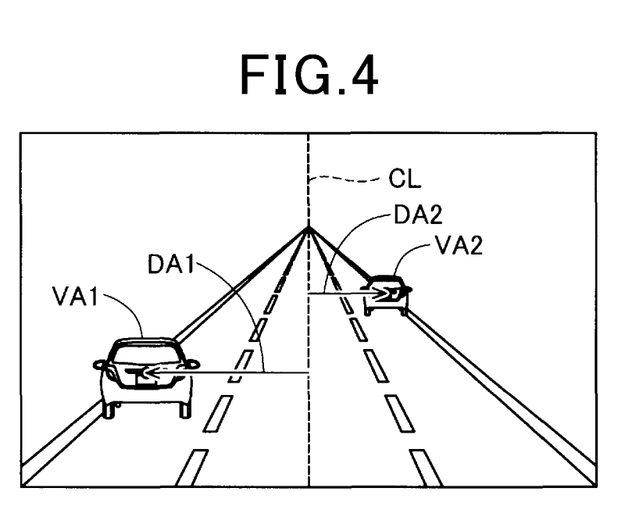
FIG. 4 is a view illustrating a direction to a first object detected by an object detection sensor.

FIG. 4 illustrates directions DA1 and DA2 of first objects VA1 and VA2 detected by the object detection sensor 20. In the present embodiment, the object detection sensor 20 includes a monocular front camera 221. The direction determining unit 110 therefore judges the directions DA1 and DA2 on the basis of positions of the first objects VA1 and VA2 in an image captured with the front camera 221. Specifically, the direction determining unit 110 calculates distances and directions (right or left) from a center line CL in an image along a traveling direction of the own vehicle 500 to centers of the first objects VA1 and VA2 in the image captured with the front camera 221, as the directions DA1 and DA2 of the first objects VA1 and VA2. In the present embodiment, a direction represents an angle and a direction (right or left) with respect to the traveling direction of the own vehicle 500. In the present embodiment, the first object mainly indicates other vehicles. The first object can include a motorcycle, a bicycle, a tricycle (trike), a pedestrian, and the like.

Figure 5:
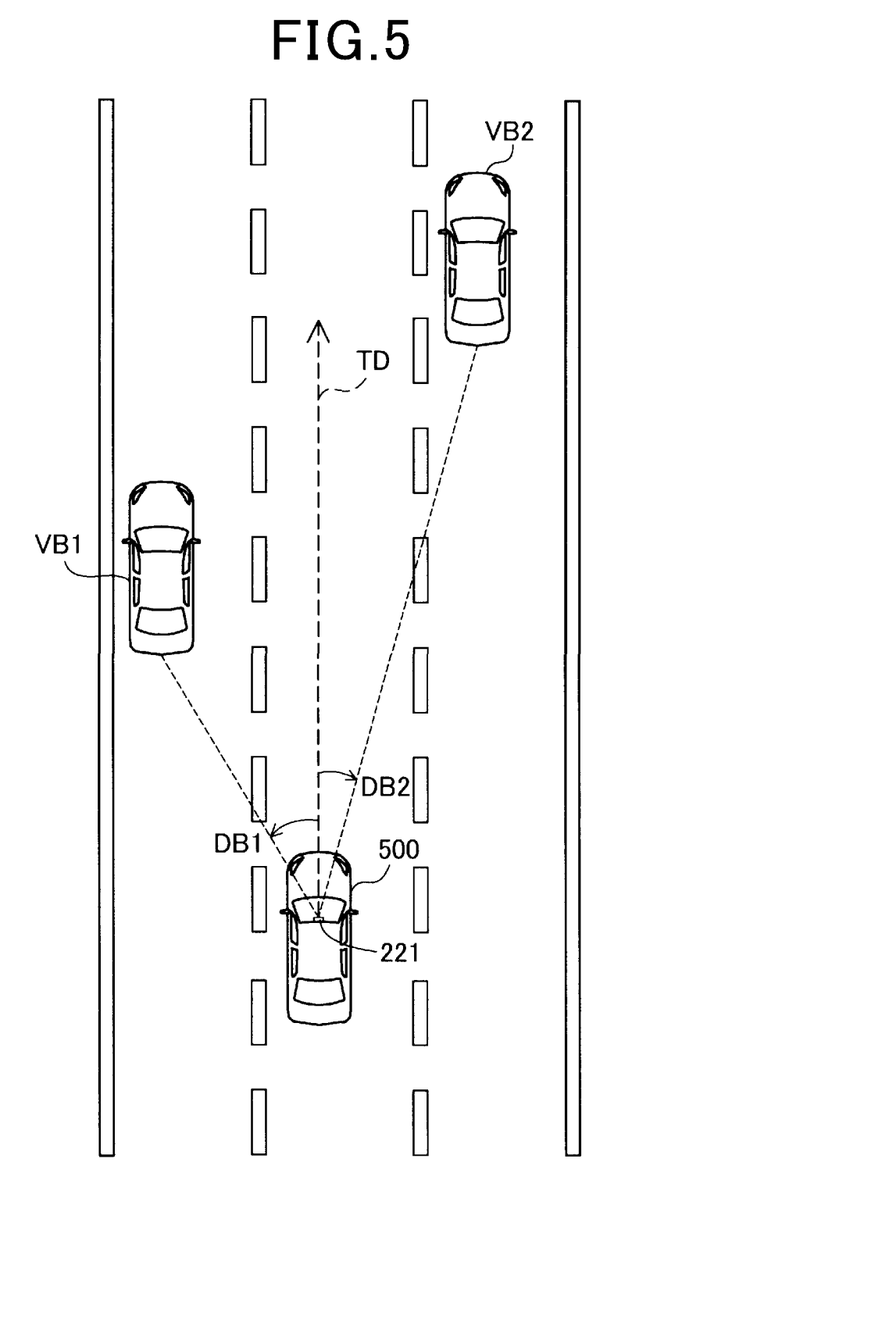
FIG. 5 is a view illustrating a direction to a second object detected by a communication unit.

FIG. 5 illustrates directions DB1 and DB2 of second objects VB1 and VB2 detected by the communication unit 28. As described above, the communication unit 28 acquires current positions of the second objects VB1 and VB2 through inter-vehicle communication in the present embodiment. The direction determining unit 110 therefore calculates directions (angles) of the second objects with respect to a traveling direction TD of the own vehicle 500 from a current position of the own vehicle 500 measured by the positioning sensor 26 of the own vehicle 500 and the current positions of the second objects VB1 and VB2. In a similar manner to the first object, the second object mainly indicates other vehicles. The second object can include a motorcycle, a bicycle, a tricycle (trike), a pedestrian, and the like, which includes or possesses a communication apparatus capable of transmitting position information of the second object to the communication unit 28. As illustrated in FIG. 5, the direction determining unit 110 preferably obtains a position of the front camera 221 on the basis of the current position of the own vehicle 500 as a reference position to obtain the direction to the second object and calculates the direction on the basis of the reference position and a position of a central portion at a posterior end of the second object calculated from the current position of the second object, so as to compare the direction to the second object with the direction to the first object (FIG. 4) detected using the front camera 221 (object detection sensor 20) with high accuracy.

In the above-described step S30, the direction determining unit 110 obtains a difference in directions by calculating a difference between the first direction DA1 and DA2 illustrated in FIG. 4 and the second directions DB1 and DB2 illustrated in FIG. 5 and judges that the first direction is the same as the second direction in a case where the difference in directions is equal to or less than a threshold (for example, three degrees) determined in advance. In a case where the object detection sensor 20 and the communication unit 28 have respectively detected a plurality of objects, the direction determining unit 110 judges whether the first direction is the same as the second direction by comparing directions between objects in closer directions (for example, between the first object VA1 in FIG. 4 and the second object VB1 in FIG. 5, and between the first object VA2 in FIG. 4 and the second object VB2 in FIG. 5).

In the above-described step S30, in a case where it is not judged that both the object detection sensor 20 and the communication unit 28 detect objects (the first object and the second object) and directions from the own vehicle 500 to these objects are the same (step S30: No), the driving support apparatus 100 acquires information from all objects which can be detected by the object detection sensor 20 and the communication unit 28 using the object detection sensor 20 and the communication unit 28 (step S40), and the driving supporting unit 112 supports driving on the basis of these kinds of information (step S80). In the present embodiment, the driving supporting unit 112 controls a pre-crash safety system (PCS) using the braking support apparatus 31 in accordance with a distance to the other vehicle as driving support. In control of the pre-crash safety system, the driving supporting unit 112 calculates a time to collision (TIC) from the distance to the other vehicle and relative speed of the other vehicle, and controls the braking apparatus 502 using the braking support apparatus 31 in accordance with the calculation result.

In the above-described step S30, in a case where it is judged that both the object detection sensor 20 and the communication unit 28 detect objects (the first object and the second object) and directions from the own vehicle 500 to these objects are the same (step S30: Yes), the identity determining unit 111 of the driving support apparatus 100 judges whether the first object detected by the object detection sensor 20 is identical with the second object detected by the communication unit 28 (step S50). In the present embodiment, in a case where a difference between an angular width of the first object and an angular width of the second object seen from the own vehicle 500 is less than a reference determined in advance, it is judged that the first object is identical with the second object. The angular width in the present embodiment refers to an angle of an interior angle at a first vertex in a triangle in a case where the current position of the own vehicle 500 is set as the first vertex, a left end of the object seen from the own vehicle 500 is set as a second vertex and a right end of the object from the own vehicle 500 is set as a third vertex.

Figure 6:
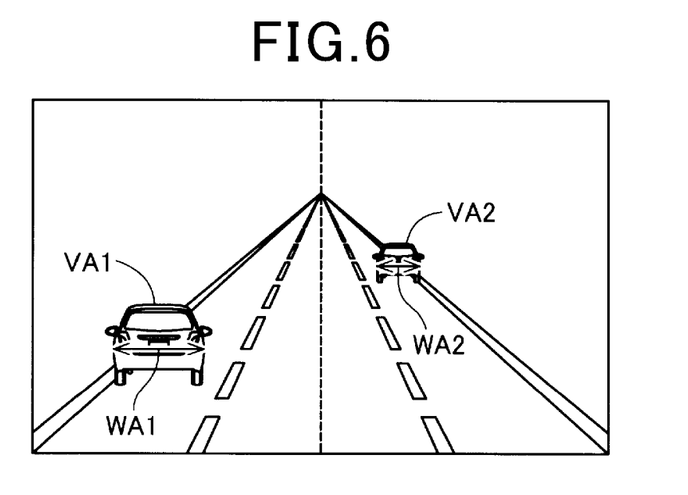
FIG. 6 is a view illustrating an angular width of the first object detected by the object detection sensor.

FIG. 6 illustrates angular widths WA1 and WA2 of the first objects VA1 and VA2 detected by the object detection sensor 20. In the present embodiment, the object detection sensor 20 includes a monocular front camera 221. The identify determining unit 111 therefore acquires an image captured with the front camera 221 and simply calculates widths of the first objects VA1 and VA2 in the image as angular widths AW1 and AW2 of the first objects VA1 and VA2 seen from the own vehicle 500.

Figure 7:
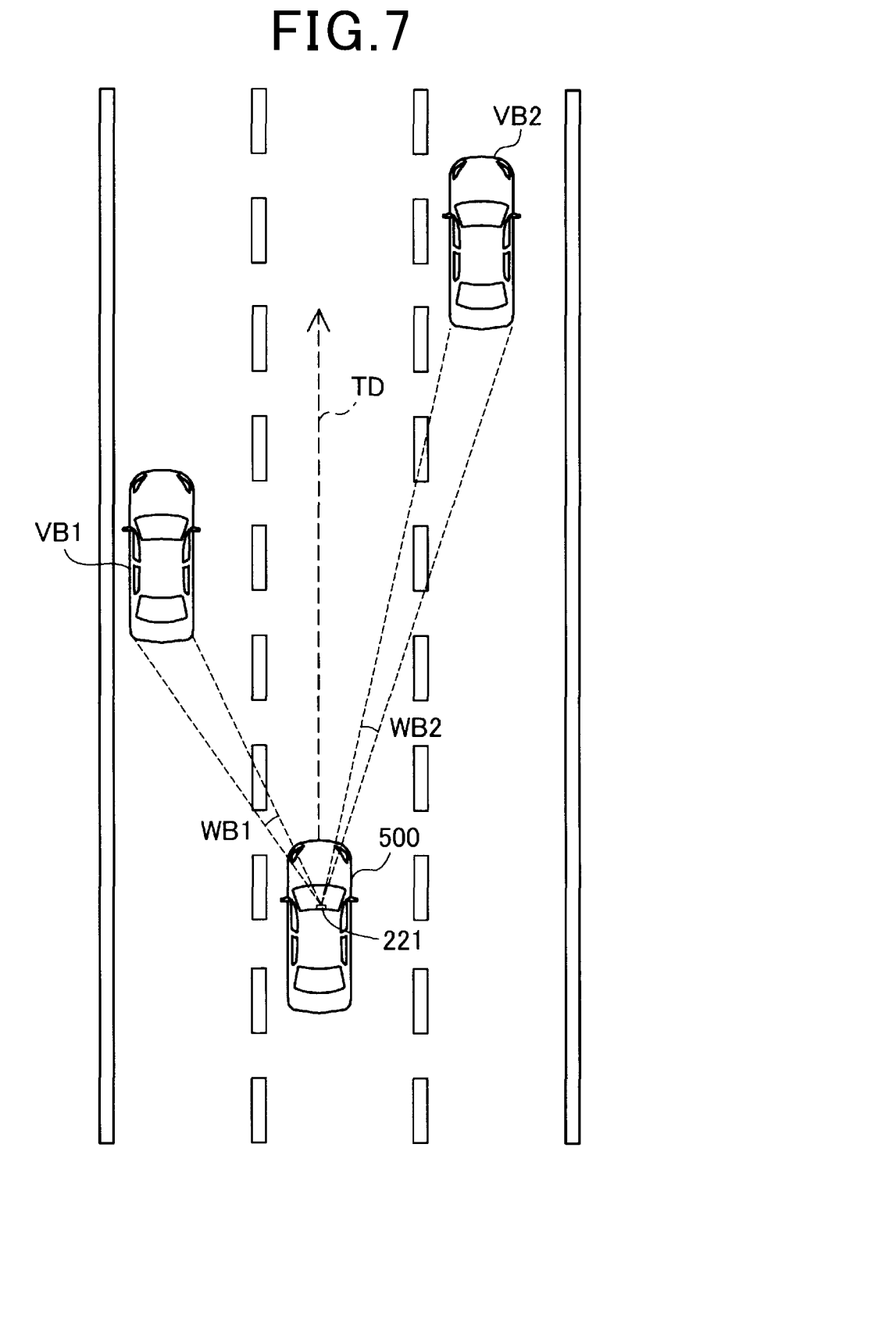
FIG. 7 is a view illustrating an angular width of the second object detected by the communication unit.

FIG. 7 illustrates angular widths WB1 and WB2 of the second objects VB1 and VB2 detected by the communication unit 28. As described above, the communication unit 28 acquires a position and a vehicle width of the second object from the second object through inter-vehicle communication in the present embodiment. The identity determining unit 111 therefore calculates lengths of three sides of the above-described triangle from the current position measured by the positioning sensor 26 of the own vehicle 500 and positions and vehicle widths of the second objects VB1 and VB2 acquired by the communication unit 28 and calculates the angular widths WB1 and WB2 of the second objects VB1 and VB2 seen from the own vehicle 500 on the basis of a law of cosines. As illustrated in FIG. 7, the identity determining unit 111 preferably obtains the position of the front camera 221 as a reference position on the basis of the current position of the own vehicle 500 to obtain the angular width of the second object and calculates the angular width on the basis of the reference position and a vehicle width of a rear end portion of the second object calculated from the current position of the second object, so as to compare the direction to the second object with the direction to the first object (FIG. 6) detected using the front camera 221 (object detection sensor 20) with high accuracy.

In the above-described step S50, the identity determining unit 111 obtains a difference between the angular widths WA1 and WA2 illustrated in FIG. 6 and the angular widths WB1 and WB2 illustrated in FIG. 7, and judges that the first object is identical with the second object in a case where the difference is less than a reference value (for example, three degrees) determined in advance. In a case where the object detection sensor 20 and the communication unit 28 respectively have detected a plurality of objects, the identity determining unit 111 judges whether the first object is identical with the second object by comparing the objects in closer directions (for example, between the first object VA1 in FIG. 6 and the second object VB1 in FIG. 7, and between the first object VA2 in FIG. 6 and the second object VB2 in FIG. 7).

In a case where the identity determining unit 111 judges that the first object is identical with the second object in step S50 (step S50: Yes), the driving supporting unit 112 acquires information necessary for driving support by the driving supporting unit 112 from the second object (other vehicle) through inter-vehicle communication using the communication unit 28 (step S60). On the other hand, in a case where the identity determining unit 111 judges that the first object is not identical with the second object in step S50 (step S50: No), the driving supporting unit 112 acquires information necessary for driving support by the driving supporting unit 112 from an object which is more likely to collide with the own vehicle 500 between the first object and the second object (step S70). In the present embodiment, the driving supporting unit 112 compares a distance (Euclidean distance) from the own vehicle 500 to the first object measured using the object detection sensor 20 with a distance (Euclidean distance) from the own vehicle 500 to the second object calculated on the basis of the information acquired by the communication unit 28 and judges the object with a shorter distance as the object which is more likely to collide.

The driving supporting unit 112 supports driving on the basis of the information acquired in step S60, the information acquired in step S70 or the information acquired in step S40 (step S80). As described above, in the present embodiment, the driving supporting unit 112 controls the pre-crash safety system using the braking support apparatus 31. To achieve this, in a case where the direction to the first object is the same as the direction to the second object, and the first object is identical with the second object, the driving supporting unit 112 obtains a distance to the other vehicle or relative speed on the basis of information of the second object, that is, the information (such as a position and speed) acquired by the communication unit 28 and controls the pre-crash safety system on the basis of the distance or the relative speed. Further, in a case where the direction to the first object is the same as the direction to the second object, but the first object is not identical with the second object, the driving supporting unit 112 controls the pre-crash safety system on the basis of information acquired from the object with a shorter distance between the first object and the second object. In a case where the distance to the first object is shorter, the driving supporting unit 112 controls the pre-crash safety system using the information (the distance or the relative speed) calculated using the object detection sensor 20, while in a case where a distance to the second object is shorter, the driving supporting unit 112 controls the pre-crash safety system using the information (the distance or the relative speed) calculated using the communication unit 28. In a case where the direction to the first object is different from the direction to the second object, the driving supporting unit 112 controls the pre-crash safety system on the basis of the information acquired from the respective objects.

According to the driving support apparatus 100 of the present embodiment described above, an acquisition source of information to be used for driving support is specified by judging whether the first object is identical with the second object as well as by judging whether the direction to the first object (first direction) detected by the object detection sensor 20 is the same as the direction to the second object (second direction) with which the communication unit 28 performs communication. It is therefore possible to perform appropriate driving support. Particularly, in the present embodiment, a monocular camera (front camera 221) is used as the object detection sensor 20. In an image coordinate system of the monocular camera, a depth per pixel is greater at a central portion of the image than in an end portion. This makes an error in a distance different between at a portion closer to the own vehicle 500 and at a portion farther from the own vehicle 500, which makes it difficult to calculate an accurate distance even if a distance to the other vehicle is tried to calculate from a height direction of the image. To solve this, in the present embodiment, in a case where it is judged that differences in directions of the objects detected by the object detection sensor 20 and the communication unit 28 are the same and the objects are identical, a distance to the other vehicle is calculated from position information acquired not from the image but through inter-vehicle communication. As a result, a distance to the other vehicle can be calculated more accurately than in a case where the distance is calculated on the basis of the image, so that it is possible to perform driving support with high accuracy.

Further, in the present embodiment, in a case where the direction to the first object is the same as the direction to the second object, but the first object is not identical with the second object, it is judged that the object which is closer to the own vehicle 500 between the first object and the second object has a higher risk of collision, and driving is supported on the basis of information acquired from the object. Consequently, even in a case where an object which is closer to the own vehicle 500 does not have inter-vehicle communication means, it is possible to control the pre-crash safety system so as to avoid collision with the object. It is therefore possible to perform driving support more appropriately.

Further, in the present embodiment, whether the first object is identical with the second object can be easily judged through judgment based on the angular width of the first object and the angular width of the second object. Particularly, in the present embodiment, a monocular camera with which, as described above, it is difficult to measure an accurate distance to the first object, is used as the object detection sensor 20. To solve this, in the present embodiment, the angular width is obtained by directly measuring the width of the first object in the image. It is therefore possible to determine whether the first object is identical with the second object with high accuracy through simple computation.

B. Other Embodiments (B-1) In the above-described embodiment, the object detection sensor 20 includes the camera ECU 22 and the front camera 221. However, the object detection sensor 20 may include the radar ECU 21 and the laser radar 211. Further, the object detection sensor 20 may include a millimeter wave radar which emits radio waves and detects reflected waves from a target, and an ECU which controls the millimeter wave radar. Alternatively, the object detection sensor 20 may be a hybrid sensor including at least two of the front camera 221, the laser radar 211 and the millimeter wave radar. The respective sensors (the front camera 221, the laser radar 211 and the millimeter wave radar) and the ECU which controls these may be respectively independent apparatuses or may be an integrated apparatus.

In a case where the laser radar 211 is used as the object detection sensor 20, the driving support apparatus 100 can obtain the direction and the angular width of the first object, for example, by specifying an angle and a range of the angle at which the first object exists in a radial scanning range which is a horizontal-direction scanning range of a laser. In a case where the millimeter wave radar is used as the object detection sensor 20, the driving support apparatus 100 can obtain the direction and the angular width of the first object, for example, by specifying a direction in which received power is equal to or greater than fixed power on the basis of a relationship between a phase difference and a direction of received power received with a plurality of reception antennas disposed at the front bumper 520.

The driving support apparatus 100 may calculate a final direction and angular width by combining two or more calculation results of the front camera 221, the laser radar 211 and the millimeter wave radar to calculate the direction and the angular width of the first object. For example, the driving support apparatus 100 may obtain the final direction and angular width by averaging the calculation results calculated using these sensors. Alternatively, the driving support apparatus 100 may obtain the final direction and angular width by averaging the calculation results while providing weights to the calculation results of the respective sensors. In this case, for example, a ratio of weights can be set as "the front camera 221: the laser radar 211: the millimeter waver radar=3:2:1". This ratio can be determined on the basis of measurement accuracy of the respective sensors, and accuracy of the finally calculated direction and angular width can be improved by setting greater weights for sensors with higher measurement accuracy.

Note that in a case where the direction and the angular width of the first object are calculated using the laser radar 211, the driving support apparatus 100 preferably obtains the direction and the angular width of the second object from information acquired through inter-vehicle communication using a position at which the laser radar 211 is attached as a reference. Further, in a case where the direction and the angular width of the first object are calculated using the millimeter wave radar, the driving support apparatus 100 preferably obtains the direction and the angular width of the second object from information acquired through inter-vehicle communication using a position at which the millimeter wave radar is attached as a reference. This allows the direction and the angular width of the second object calculated on the basis of inter-vehicle communication to be compared with the direction and the angular width of the first object detected using the respective sensors with high accuracy.

(B-2) In the above-described embodiment, the communication unit 28 acquires information from the object through inter-vehicle communication. However, an information acquisition method is not limited to inter-vehicle communication. For example, information may be acquired from the object through road-to-vehicle communication, communication via a wireless LAN and a smartphone, and the like.

(B-3) In the above-described embodiment, as illustrated in FIG. 4, the direction determining unit 110 calculates the distance and the direction from the center line CL of the image to the center of the first object as the direction to the first object. However, the direction determining unit 110 may calculate the distance and the direction from the center line CL of the image to a right end or a left end of the first object as the direction to the first object. Further, the direction determining unit 110 may judge that the direction to the first object is the same as the direction to the second object if at least one of differences in directions calculated on the basis of the direction based on the distance and the direction from the center line CL to the center of the first object, the direction based on the distance and the direction from the center line CL to the right end of the first object and the direction based on the distance and the direction from the center line CL to the left end of the first object, is equal to or less than a threshold.

(B-4) In the above-described embodiment, a threshold for a difference in directions to be used as a criterion for judging whether the direction to the first object is the same as the direction to the second object may be changed in accordance with an area on the image in which the first object is detected. For example, a lens of the front camera 221 has characteristics that accuracy of a direction is likely to be lower in a peripheral portion (wide-angle area) than in a central portion of the image. The threshold for a difference in directions may be therefore set greater for an object detected from the peripheral portion of the image than for an object detected from the central portion of the image.

(B-5) In the above-described embodiment, in a case where the processing illustrated in FIG. 3 is repeatedly executed, a threshold for a difference in directions to be applied to the first object and the second object which have been determined as identical once by the identify determining unit 111 may be set greater than an initial threshold. This can improve robustness against instantaneous deviation of the direction. Further, the threshold may be made variable on the basis of a frequency of the first object being determined as identical with the second object. For example, in a case where a frequency of the first object being determined as identical with the second object is lower, the threshold may be set smaller, while in a case where a frequency of the first object being determined as identical with the second object is higher, the threshold may be set greater. This can also improve robustness against instantaneous deviation of the direction.

(B-6) In the above-described embodiment, the identity determining unit 111 judges whether the first object is identical with the second object on the basis of the angular widths of the first object and the second object. However, the identity judging method is not limited to this. For example, the identity determining method 111 may judge whether the first object is identical with the second object on the basis of heights, color, shapes, or numbers (vehicle numbers) of the objects. Of course, whether the first object is identical with the second object may be judged using a combination of some of these elements.

(B-7) In the above-described embodiment, a reference value of a difference in angular widths to be used by the identity determining unit 111 to judge whether the objects are identical with each other does not have to be a fixed value. For example, the identity determining unit 111 may judge whether the objects are identical with each other using a reference value which linearly or non-linearly changes in accordance with the angular widths. Alternatively, for example, the identity determining unit 111 may store an allowable difference in widths and obtain a reference value by converting the difference in widths into a difference in angular widths. Alternatively, the reference value may be made variable on the basis of a frequency of the first object being determined as identical with the second object.

(B-8) In the above-described embodiment, even in a case where the identity determining unit 111 judges that the first object is identical with the second object in step S50 in the processing flow illustrated in FIG. 3, the driving supporting unit 112 may support driving in step S80 using information (such as, for example, color and shapes of objects) acquired using the object detection sensor 20 as well as the information acquired through inter-vehicle communication in step S60. Further, for example, in a case where information can be acquired in a shorter cycle using the object detection sensor 20 than using the communication unit 28, driving support may be performed by acquiring the information using the object detection sensor 20.

(B-9) In the above-described embodiment, the driving supporting unit 112 controls the pre-crash safety system using the braking support apparatus 31 in accordance with the distance to the other vehicle. In contrast, the driving supporting unit 112 may perform driving support other than control of the pre-crash safety system as driving support. For example, the driving supporting unit 112 may perform control of constant speed traveling and a distance between vehicles (adaptive cruise control (ACC)) in accordance with the distance to the other vehicle or may give a warning of a risk of collision using the alarm 40 in accordance with the distance to the other vehicle. Further, the driving supporting unit 112 may select an object from which information is to be acquired between the first object and the second object in accordance with driving support in a case where it is determined that the first object is identical with the second object. For example, in control of the pre-crash safety system, information may be acquired from the first object detected by the object detection sensor 20, while, in control of constant speed traveling and a distance between vehicles, information may be acquired from the second object detected by the communication unit 28.

(B-10) In the above-described embodiment, in a case where the processing illustrated in FIG. 3 is repeatedly executed, the driving supporting unit 112 may change weights on information to be utilized for driving support on the basis of a frequency of the identity determining unit 111 determining that the first object is identical with the second object. For example, the driving supporting unit 112 may make a weight of the information of the second object acquired using the communication unit 28 greater than a weight of the information of the first object acquired using the object detection sensor 20 as it has been more frequently determined that the first object is identical with the second object. Alternatively, the driving supporting unit 112 may change weights on information to be utilized for driving support in accordance with a degree of divergence between the difference in angular widths calculated by the identity determining unit 111 and the reference value. For example, as a difference between the difference in angular widths and the reference value is smaller, the weight of the information of the second object acquired using the communication unit 28 may be set greater than the weight of the information of the first object acquired using the object detection sensor 20.

(B-11) In the above-described embodiment, the driving supporting unit 112 acquires information of an object which is closer to the own vehicle 500 between the first object and the second object in step S70 illustrated in FIG. 3. In contrast, the driving supporting unit 112 may select an object from which the information is to be acquired not on the basis of whether distances to objects are longer or shorter but on the basis of whether a difference in distances is equal to or greater than a fixed value. For example, in a case where a distance measured using the object detection sensor 20 is shorter than a distance measured using the communication unit 28 by equal to or greater than 10 m, the driving supporting unit 112 may acquire information on the first object using the object detection sensor 20. In this case, a value to be compared with the difference in distances does not have to be a fixed value and may be made variable, for example, in accordance with a frequency of the first object having been determined as identical with the second object in the past or the measured distances. Alternatively, the value to be compared with the difference in distances may be made variable in accordance with driving support. Note that while, in the above-described embodiment, a Euclidean distance is calculated as the distance from the own vehicle 500 to the first object or the second object, a distance along the traveling direction TD of the vehicle 500 may be calculated as these distances. The distance along the traveling direction TD of the vehicle 500 is an interval between the vehicle 500 and the first object or the second object in a Y direction in a case where the traveling direction of the vehicle 500 in an XY coordinate system is set as the +Y direction.

(B-12) In the above-described embodiment, the driving supporting unit 112 judges that an object which is closer to the own vehicle 500 is more likely to collide in step S70 illustrated in FIG. 3. In contrast, the driving supporting unit 112 may calculate relative speed between the own vehicle 500 and the object and a time to collision instead of calculating a distance to the own vehicle 500 and may judge whether the object may collide with the own vehicle 500 on the basis of the relative speed and the time to collision. For example, in a case where the time to collision is used, the driving supporting unit 112 judges that an object with a shorter time to collision is more likely to collide. The present disclosure is not limited to the above-described embodiments and can be implemented with various configurations within a scope not deviating from the gist of the present disclosure. For example, technical featured in the above-described embodiment can be replaced or combined as appropriate to solve part or all of the above-described problems to be solved or to achieve part or all of the above-described effects. Further, the technical features, which are not described as essential features in the present specification, can be deleted as appropriate.

The present disclosure can be implemented as the following aspect.

According to one aspect of the present disclosure, a driving support system (10) mountable to an own vehicle (500) is provided. This driving support system includes an object detection sensor (20) capable of detecting a first object which exists in front of the own vehicle, a communication unit (28) capable of performing communication with a second object which exists around the own vehicle, a direction determining unit (110) configured to determine whether a first direction from the own vehicle to the first object detected by the object detection sensor is the same as a second direction from the own vehicle to the second object with which the communication unit performs communication, an identity determining unit (111) configured to determine whether the first object is identical with the second object on the basis of information acquired by the object detection sensor and the communication unit in a case where the first direction is the same as the second direction, and a driving support unit (112) configured to perform driving support on the basis of information acquired from an object determined in advance between the first object and the second object in a case where it is determined that the first object is identical with the second object.

According to the driving support system in such an aspect, it is possible to specify an acquisition source of information to be used for driving support by determining whether the first object is identical with the second object as well as by determining whether the direction to the first object detected by the object detection sensor is the same as the direction to the second object with which the communication unit performs communication, so that it is possible to perform appropriate driving support.

The present disclosure can be implemented in various forms other than the driving support system. For example, the present disclosure can be implemented in a form such as a method to be executed by the driving support system, a computer program for implementing the method, and a non-transitory tangible recording medium in which the computer program is stored.

What is claimed is:

1. A driving support system mountable to an own vehicle, the driving support system comprising:
    an object detection sensor capable of detecting a first object which exists in front of the own vehicle;
    a communication unit capable of performing communication with a second object which exists around the own vehicle;
    a direction determining unit configured to
        calculate i) a first direction from the own vehicle to the first object detected by the object detection sensor, and ii) a second direction from the own vehicle to the second object with which the communication unit performs communication, and
        determine whether the first direction is the same as the second direction;
    an identity determining unit configured to determine whether the first object is identical with the second object on the basis of information acquired by the object detection sensor and the communication unit in a case where the first direction is the same as the second direction; and
    a driving supporting unit configured to perform driving support on the basis of information acquired from an object determined in advance between the first object and the second object in a case where it is determined that the first object is identical with the second object.

2. The driving support system according to claim 1, wherein the driving supporting unit performs the driving support on the basis of information acquired from an object which is more likely to collide with the own vehicle between the first object and the second object in a case where it is determined that the first object is not identical with the second object.

3. The driving support system according to claim 2, wherein the driving supporting unit judges that an object which is closer to the own vehicle has a higher risk of collision between the first object and the second object.

4. The driving support system according to claim 1, wherein the driving supporting unit performs the driving support on the basis of information acquired using the communication unit from the second object in a case where it is determined that the first object is identical with the second object.

5. The driving support system according to claim 1, wherein the identity determining unit obtains an angular width of the first object seen from the own vehicle using the object detection sensor, obtains an angular width of the second object seen from the own vehicle using the information acquired by the communication unit, and determines whether the first object is identical with the second object on the basis of the angular width of the first object and the angular width of the second object.

6. The driving support system according to claim 1, wherein the object detection sensor includes a camera, and
    the direction determining unit obtains the first direction on the basis of a position of the first object in an image captured with the camera.

7. The driving support system according to claim 1,
wherein the object detection sensor includes a camera, and
the identity determining unit determines whether the first object is identical with the second object using a first width which is a width of the first object in an image captured with the camera.

8. The driving support system according to claim 1,
wherein the direction determining unit obtains the second direction on the basis of a position of the own vehicle and information representing a position of the second object acquired by the communication unit.

9. The driving support system according to claim 1,
wherein the identity determining unit calculates a second width which is a width of the second object seen from the own vehicle using the position of the own vehicle, the information representing the position of the second object acquired by the communication unit and information representing the width of the second object acquired by the communication unit, and determines whether the first object is identical with the second object using the second width.

10. A method to be executed by a driving support system mountable to an own vehicle, the method comprising:
   detecting a first object which exists in front of the own vehicle using an object detection sensor;
   performing communication with a second object which exists around the own vehicle using a communication unit;
   calculating i) a first direction from the own vehicle to the first object detected by the object detection sensor, and ii) a second direction from the own vehicle to the second object with which the communication unit performs communication;
   determining whether the first direction is the same as the second direction;
   determining whether the first object is identical with the second object on the basis of information acquired by the object detection sensor and the communication unit in a case where the first direction is the same as the second direction; and
   performing driving support on the basis of information acquired from an object determined in advance between the first object and the second object in a case where it is determined that the first object is identical with the second object.

11. The driving support system according to claim 1, wherein
   the communication unit of the own vehicle acquires positions of the second object through communication with the second object.

* * * * *